Patented Apr. 22, 1947

2,419,342

UNITED STATES PATENT OFFICE 2,419,342

CATALYSTS FOR HYDROCARBON CONVERSION

Kenneth C. Edson, Los Angeles, Calif., and Frank E. Fisher, Pawhuska, Okla., assignors to Skelly Oil Company, Tulsa, Okla., a corporation of Delaware No Drawing. Original application December 7, 1942, Serial No. 468,110. Divided and this application June 19, 1944, Serial No. 541,118

6 Claims. (Cl. 252—211.5)

The present invention relates to catalysts suitable for the production of aromatic hydrocarbons from aliphatic hydrocarbons. More specifically the invention relates to refractory catalytic materials which are particularly effective in promoting the conversion of aliphatic hydrocarbons into aromatic hydrocarbons.

In accordance with this invention, it has been found that the activity of an aromatization catalyst may be greatly enhanced by associating barium peroxide therewith. In accordance with one embodiment of this invention, the aromatization catalyst with which the barium peroxide is associated may comprise a suitable carrier, such as Activated Alumina, in admixture with an oxide or other compound of chromium, vanadium or molybdenum, or mixtures thereof.

One of the objects of the invention therefore is a catalyst prepared by depositing upon a suitable carrier a catalytically active insoluble compound of a metal selected from the group consisting of chromium, molybdenum and vanadium, preferably the oxides, and more specifically the sesquioxides of said metals, together with a certain amount of barium peroxide.

A further object of the invention relates to catalysts made from barium compounds capable of yielding barium peroxide and a carrier upon which there has previously been deposited the oxide, sesquioxide or other compound of chromium, molybdenum or vanadium, or mixtures thereof, under such conditions as to avoid any undesired reactions between the added barium compound and the already present compound of chromium, molybdenum or vanadium. For the oxides or other compounds of chromium, molybdenum, or vanadium may be substituted other catalytic materials suitable for use in an aromatization process, such as the oxides or other compounds of titanium, zirconium, cerium, hafnium, thorium, columbium, tantalum, tungsten, uranium, or the like, or mixtures thereof.

The present application is a division of our application Serial No. 468,110, filed December 7, 1942.

In accordance with one embodiment of the present invention, and to prepare the catalysts claimed herein, there is prepared, in a preliminary step, a dry catalytic material comprising a catalytically active material such as a sesquioxide of chromium, molybdenum or vanadium deposited on a suitable carrier such as granulated Activated Alumina, the latter being present in major amounts. To this dry catalytic material is then added either an oxide or a solution of a salt of barium, according to the methods hereinafter more definitely described, and the thus produced catalytic material is dried, and then heated in a stream of air or oxygen to convert the barium compound to barium peroxide.

The present invention is therefore particularly concerned with catalytic materials made in such a manner as to have present in the final product a catalyst comprising a major amount of a carrier and a minor amount of an aromatization catalyst having barium peroxide in association therewith.

It appears that the activity of the catalysts of the present invention is attributable to the two minor ingredients, that is to say, the aromatization catalyst (i. e. the oxide of chromium, molybdenum or vanadium), and the barium peroxide, since it has been found that the activity of the finished catalysts is greater than the activity of one containing either of the minor ingredients alone on the same carrier.

It has been found by the inventors that the activity of the catalysts of the present invention varies considerably with variations in the method of preparation and also to some extent with the purity of the reagents used. For example, it was found that a catalyst made with the use of bauxite as a carrier was somewhat inferior to one made with a high grade of activated alumina. Therefore it is evident that for the optimum results purified starting materials should be employed. The preparation of the catalyst may be accomplished in a number of ways with a corresponding variation in its activity and the methods described hereinbelow are those which produce catalysts of high activity and yet are relatively simple in their method of preparation. The methods of producing our improved catalysts are claimed in our aforementioned parent application, Serial No. 468,110.

The chromium, molybdenum or vanadium oxides may be incorporated with the carrier by impregnating the carrier with a suitable solution of a salt or acid of the corresponding metal. For example, the carrier may be impregnated with an aqueous solution of chromic acid, ammonium chromate, chromium nitrate, ammonium molybdate, ammonium vanadate or the like in accordance with the well known prior art processes. The resulting material may then be dried, and thereafter heated to the decomposition temperature of the compound or salt employed to form within the carrier the oxide or sesquioxide of chromium, molybdenum or vanadium.

As for the barium peroxide, this may be admixed directly with the catalyst as such or it may be derived either from barium oxide or from a solution of a salt such as barium nitrite, Ba(NO₂)₂. The barium compound is deposited on the carrier, as hereinafter more particularly specified, and the mixture is dried. In case the barium salt is used, the mixture is then heated to decomposition temperatures to form the oxide. Thereafter the catalyst containing the barium oxide is heated to a temperature of from 500° to 600° C. or thereabouts, in a stream of air or oxygen, so as to convert the barium oxide into barium peroxide. If the barium peroxide is admixed with the catalyst as such, this last mentioned oxidation step is not necessary.

Certain difficulties are encountered when an attempt is made to place the barium compound on the carrier, and it has been discovered that certain precautions must be taken in order to avoid these. Thus, when either the oxide or the peroxide of barium is used, water cannot be employed as a solvent because of the reactivity of the barium oxide or peroxide with water, thereby forming barium hydroxide, which compound is very stable and will not decompose until the temperature of approximately 980° C. is reached, which is far beyond the temperatures in which the catalysts are intended to be used for the conversion of the aliphatic hydrocarbons to the aromatic hydrocarbons. Therefore, when barium oxide or peroxide is used, it has been found that the best method of incorporating these materials with the carrier is to wet the carrier with some nonionizing nonaqueous solvent such as may be exemplified on the one hand by acetone and on the other hand by hydrocarbons or hydrocarbon halides such as carbon tetrachloride, trichlorethylene and the like, while mechanically incorporating the barium compound with the thus wetted carrier. This produces a thorough distribution of the barium compound with the carrier.

Another reason for using this method of incorporation is because if for example an aqueous solution of a salt of barium were to be used, this would tend to react with the chromium, molybdenum or vanadium radicals of the corresponding compounds to form insoluble barium compounds which are exceedingly stable and can only be decomposed to the corresponding oxides at very high temperatures, which thus makes it necessary to decompose the salt of chromium, molybdenum or vanadium which is employed to the corresponding oxide prior to the deposition of the barium salt.

However, these difficulties can easily be overcome particularly in the manner hereinafter set forth, and they therefore do not effect any limitations to the present invention.

Catalysts prepared by the above general procedure evidently possess a large total contact surface of high activity not obtainable by either active ingredient alone. This activity is maintained after many alternate periods of use and reactivation as evidenced by the fact that the catalyst may be repeatedly reactivated by passing air or other oxidizing gas over the spent particles to burn off deposits of carbonaceous material at temperatures below 900° C. without material loss of catalytic activity.

The following examples of preparation of the types of catalysts peculiar to the present invention are given to indicate their novelty and utility although not for the purpose of limiting the invention in exact agreement with the data introduced. In each of the following examples chromium compounds are used to illustrate the various ways in which the catalyst may be prepared but it must be remembered that it is not intended to limit the catalysts to the chromium compounds shown. The processes indicated in the following examples will work equally well for the corresponding compounds of molybdenum, vanadium, or certain other metals as hereinbefore and hereinafter specified.

*Example I*

A high grade of alumina comminuted so as to form particles of from 10 to 12 mesh was impregnated with a solution of chromic acid of such concentration as to produce in the final product a deposit of chromium sesquioxide in the carrier to an extent of about 8 per cent by weight of the carrier, whereafter the mixture thus obtained was evaporated to dryness. The intermediate material thus produced was then moistened with acetone and had added thereto 8 per cent by weight of barium peroxide which was mechanically mixed with the wetted material until a thorough blending of the ingredients was obtained. The mixture thus obtained was then placed in the reaction chamber and heated first to drive off all of the acetone and was then heated to the reaction temperature for a comparatively short period of time, say about two hours, which permits the chromic acid anhydride to decompose with a formation of chromium sesquioxide. This completed the formation of the catalyst which was then ready for converting hydrocarbons which was accomplished by passing the vapors of the desired hydrocarbons over the catalyst, and then condensing the resulting effluent from the catalytic chamber or tube.

When processing, for example, normal heptane in a once-through operation, with a conversion temperature of about 560° C., a 48 per cent by weight conversion of the normal heptane into aromatic compounds was attained.

In our co-pending application Serial No. 488,888, filed May 28, 1943, now Patent No. 2,380,035, as a continuation-in-part of our application Serial No. 468,111, processes involving the use of the present catalysts are more fully described and claimed.

It is of course obvious that a catalyst consisting of molybdenum sesquioxide and barium peroxide or of vanadium sesquioxide and barium peroxide can be made in a similar manner.

*Example II*

A high grade of Activated Alumina comminuted to form particles of from 10 to 12 mesh was impregnated with an aqueous solution of chromium (ic) nitrate of such concentration as to yield about 8 per cent of chromium sesquioxide on the basis of the carrier upon decomposition, and the mixture was then evaporated to dryness to remove the water. The thus treated carrier was then moistened with acetone and there was added to the mixture 8 per cent by weight of barium oxide. The mixture thus obtained was then placed in a reaction chamber, the acetone evaporated, and the resulting complex heated at about 550° C. in a stream of air for two hours. This resulted in the decomposition of the chromic nitrate with the formation of chromium sesquioxide, while at the same time the barium oxide became oxidized to barium peroxide. At the end of that time the catalyst was ready for use.

When processing normal heptane in a once-through operation under the conditions of Example I, the conversion on the basis of percentage was approximately the same as in the case of Example I, namely about 48 per cent.

*Example III*

High grade Activated Alumina of the type already mentioned was impregnated with an aqueous solution of ammonium chromate of such a concentration and in such amounts as to yield about 8 per cent of chromium sesquioxide on decomposition, and the resulting mixture was evaporated to dryness, and then heated to about 250° C. for about an hour in order to decompose the ammonium chromate with the corresponding formation of chromium sesquioxide.

The material thus obtained was thereafter impregnated with an aqueous solution of barium nitrite of such concentration and in such amounts as to be capable of yielding eventually about 8 per cent of barium oxide in the composition, and this mixture was evaporated to dryness. The catalyst was then placed in the reaction chamber and heated to a temperature of about 550° C. for about two hours in a stream of air for the purpose of decomposing the barium nitrite into barium oxide, and then thereafter to oxidize the oxide to the peroxide. At the end of this time the catalyst was ready for use.

When processing normal heptane in a once-through operation under the conditions set forth hereinabove in Example I, the percentage of conversion was somewhat higher than in Examples I and II, probably because of more even distribution of the barium peroxide in the catalytic mass, by reason of the method of incorporation.

The catalysts of the present invention are characterized by the high activity and freedom from poisoning; moreover if they should become somewhat inactivated as a result of the deposition thereon of carbon or carbonaceous or tarry material they can readily be restored substantially to their original activity by the expedient of heating the same to about the conversion temperature and up to 900° C. or thereabout in a current of an oxygen-containing gas such as air, or air diluted with inert gases, so as to burn off the carbonaceous material and to restore the barium oxide to the peroxide stage in case it should have become reduced to the oxide. The catalyst after such regeneration may then be used for treating further quantities of aliphatic hydrocarbons so as to convert them into aromatic hydrocarbons with about the same number of carbon atoms.

In the foregoing examples, the sesquioxides of chromium, molybdenum, or vanadium or mixtures thereof have been specifically referred to as one of the active ingredients of the catalyst of the invention. It is not intended that this invention should be limited thereto, however, since other aromatization or dehydrogenating and cyclicizing catalysts may be substituted therefor, such as the oxides or other compounds of titanium, zirconium, cerium, hafnium, thorium, columbium, tantalum, tungsten or uranium, or mixtures thereof. Also, even though activated alumina has been specified as the preferred carrier or support for the catalyst of this invention, other suitable supports or carriers may be employed such as magnesium oxide, aluminum oxide, bauxite, bentonite clays, montmorillonite clays, kieselguhr, crushed firebrick, crushed silica, glauconite, etc.

Saving for themselves such equivalents as will be apparent to those familiar with the art to which this invention falls, applicants claim:

1. A catalyst for hydrocarbon conversion consisting essentially of about 84% by weight of a carrier, about 8% of an oxide from the group consisting of chromium oxide, vanadium oxide and molybdenum oxide, and about 8% of barium peroxide.

2. The catalyst claimed in claim 1, in which the carrier is aluminum oxide.

3. The catalyst claimed in claim 1, in which the carrier is activated alumina.

4. A catalyst for hydrocarbon conversion consisting essentially of about 84% of aluminum oxide, about 8% of chromium oxide, and about 8% of barium peroxide.

5. A catalyst for hydrocarbon conversion consisting essentially of about 84% of aluminum oxide, about 8% of vanadium oxide, and about 8% of barium peroxide.

6. A catalyst for hydrocarbon conversion consisting essentially of about 84% of aluminum oxide, about 8% of molybdenum oxide, and about 8% of barium peroxide.

KENNETH C. EDSON.
FRANK E. FISHER.

REFERENCES CITED

The following references are of record in the file of this patent:

UNITED STATES PATENTS

| Number | Name | Date |
| --- | --- | --- |
| 2,311,979 | Corson et al. | Feb. 23, 1943 |
| 2,231,446 | Grosse | Feb. 11, 1941 |
| 2,092,449 | Fuchs | Sept. 7, 1937 |

OTHER REFERENCES

Parkes et al., Mellor's Modern Inorganic Chemistry, Longmans, Green & Co., N. Y., 1939, page 637. (Copy in Div. 3.)